United States Patent
Liss et al.

(10) Patent No.: US 7,681,068 B2
(45) Date of Patent: Mar. 16, 2010

(54) SYSTEM AND METHOD FOR PROVIDING EVENT HYSTERESIS IN NETWORK MANAGEMENT SYSTEMS

(75) Inventors: Jonathan M. Liss, Marlboro, NJ (US); Jeffrey A. Deverin, Sayreville, NJ (US); Wilko Eschebach, Red Bank, NJ (US); Ricardo E. Alves, Eatontown, NJ (US); Renata F. Bodner, Hillsborough, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 1106 days.

(21) Appl. No.: 10/733,780

(22) Filed: Dec. 11, 2003

(65) Prior Publication Data

US 2005/0015777 A1 Jan. 20, 2005

Related U.S. Application Data

(60) Provisional application No. 60/484,505, filed on Jul. 2, 2003.

(51) Int. Cl.
*H04L 12/24* (2006.01)
*G06F 15/173* (2006.01)

(52) U.S. Cl. .............................. 714/4; 714/47; 709/223

(58) Field of Classification Search ................ 719/318; 709/223; 714/4, 47
See application file for complete search history.

(56) References Cited

U.S. PATENT DOCUMENTS

| 4,543,567 | A | * | 9/1985 | Shirata et al. ............... 340/519 |
|---|---|---|---|---|
| 5,155,468 | A | * | 10/1992 | Stanley et al. ............... 340/501 |
| 5,469,148 | A | * | 11/1995 | Baumann et al. ............ 340/658 |
| 6,006,016 | A | * | 12/1999 | Faigon et al. ................. 714/48 |
| 6,124,790 | A | * | 9/2000 | Golov et al. ................ 340/508 |
| 6,205,563 | B1 | * | 3/2001 | Lewis .......................... 714/47 |
| 6,253,339 | B1 | * | 6/2001 | Tse et al. ...................... 714/47 |
| 6,414,595 | B1 | * | 7/2002 | Scrandis et al. ............. 340/506 |
| 6,513,129 | B1 | * | 1/2003 | Tentij et al. ..................... 714/4 |
| 6,570,592 | B1 | * | 5/2003 | Sajdak et al. ............... 715/769 |
| 6,694,364 | B1 | * | 2/2004 | Du et al. ...................... 709/224 |
| 6,862,698 | B1 | * | 3/2005 | Shyu ............................ 714/57 |
| 2002/0042847 | A1 | * | 4/2002 | Takats et al. ................ 709/316 |

OTHER PUBLICATIONS

European Office Action dated Sep. 12, 2005 issued in corresponding European Patent Application No. 04253600.3.
European Search Report dated Oct. 21, 2004 for European Application No. 04253600.3-1525.

* cited by examiner

*Primary Examiner*—Li B Zhen
(74) *Attorney, Agent, or Firm*—Grossman, Tucker, Perreault & Pfleger, PLLC

(57) ABSTRACT

A system and method for managing toggling events in a network management system. The event is monitored and if the event maintains one of first and second states for a predetermined amount of time it is reported through the network management system. In one embodiment, if the event is a toggling alarm it is reported as active immediately and if it remains cleared for a predetermined amount of time it is reported as cleared.

40 Claims, 4 Drawing Sheets

SYSTEM AND METHOD FOR PROVIDING EVENT HYSTERESIS IN NETWORK MANAGEMENT SYSTEMS

CROSS REFERENCE TO RELATED APPLICATIONS

The present application claims the benefit of the filing date of U.S. Application Ser. No. 60/484,505, filed Jul. 2, 2003, the teachings of which are incorporated herein by reference.

FIELD OF THE INVENTION

The present invention relates to Network Management Systems (NMS), and, in particular, to a system and method incorporating hysteresis principles when processing events, such as an alarm, in a network management system.

BACKGROUND

NMS systems are employed in a variety of network types to conduct system-level management of the elements of the network. Generally, a NMS performs functions including: alarm/fault management, performance management, configuration management, security management and business/account management. These systems may receive or request information from the underlying network elements, and provide management information to a network administrator through a user interface. A network administrator may also actively manage the configuration of the network and/or network elements through the user interface.

In networks such as Wavelength Division Multiplexing (WDM) optical communication networks, event management, e.g. alarm management, is a crucial function of the NMS. In the case of alarm reporting, for example, any alarms reported by a network element must be accurately reported with minimized latency so that a network administrator may take corrective action. Delays in reporting alarms can lead to unnecessary system failure and loss of network traffic. Inaccurate reporting, e.g. as to the time and/or location of a fault, can also lead to delays in system repair, Service Level Agreement (SLA) violations, and/or unnecessary remedial effort.

Known NMS configurations immediately report all alarms reported by all network elements. A problem arises, however, when reported alarms toggle between states. This can occur in an optical communication network when performance criteria for a network element, e.g. bit error rate, FEC error count, laser current, etc., intermittently moves between acceptable and unacceptable levels, or when a network element is on the verge of failure and generates frequent clearing alarm(s). Forwarding each state change of toggling alarms to a network administrator can cause serious NMS performance and capacity problems, which can even lead to paralyzing the whole NMS through alarm event report flooding. Other impacts include response time degradations, service denial, and overwhelming the network administrator with unimportant information.

Accordingly, there is a need for a system and method for managing toggling events, such as alarms, in an NMS that can prevent performance degradation caused by an excessive number of processed events, while still reporting critical events to the network administrator with minimal latency.

SUMMARY OF THE INVENTION

A system consistent with the invention includes a variety of aspects. According to one aspect of the invention there is provided a method of managing an event toggling between first and second event states in the NMS. The method includes: determining if the event maintains one of the first and second states for a predetermined amount of time; and reporting the maintained one of the first and second states when the one of the first and second states is maintained for the predetermined amount of time. In one embodiment, if the toggling event, e.g. an alarm, is reported as active, and if it remains cleared for a predetermined amount of time it is reported as cleared.

According to another aspect of the invention, there is provided a machine readable medium whose contents cause a system to perform a method of managing an event toggling between first and second event states in a network management system including: determining if the event maintains one of the first and second states for a predetermined amount of time; and reporting the maintained one of the first and second states when the one of the first and second states is maintained for the predetermined amount of time. A NMS and an optical communication system are also provided.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

For simplicity and ease of explanation, the present invention will be described herein in connection with various exemplary embodiments thereof associated with toggling alarms, a subset of the more generic toggling event scenario in an optical communication network. Those skilled in the art will recognize that the features and advantages of the present invention may be implemented in a variety of network types and configurations. In addition, the invention is not limited to management of toggling alarms, and is applicable to management of any event on a network having a toggling state. It is to be understood, therefore, that the embodiments described herein are presented by way of illustration, not of limitation.

In general, a system and method consistent with the invention manages toggling events, e.g. alarms, in an optical network by providing a hysteresis feature in the alarm reporting function of the NMS. In one embodiment, toggling alarms are reported as active or set alarms to the NMS as soon as they are received from the network elements. These alarms are periodically monitored for state changes. If another event is received indicating that the alarm state is cleared, the system observes the alarm for a period of time, the alarm stable time, to ensure that the alarm is really stable (e.g. cleared). If no additional alarm state changes occur within the alarm stable time, the alarm is reported as clear, with the clear time being the time when the alarm had its last state change. Advantageously, a system and method consistent with the invention may also report that an active alarm is, or is not, a toggling alarm, and also may report the number of times an alarm toggled before it finally was cleared and stayed cleared for the alarm stable time.

This feature advantageously prevents the NMS internal processes from becoming overwhelmed with state changes of toggling alarms, so that the performance of the NMS is not impacted and the user is not flooded with useless information concerning toggling alarms. The important information that an active alarm is in a toggling state may still be provided to the network user. This approach may be implemented with any network event, and is not limited to alarm reporting. Toggling of other network events (such as, relay state changes) may be managed in the same way by simply defining a stable state for the event, e.g. in a stable state configuration table which also contains the default state for each event type.

Figure 1:
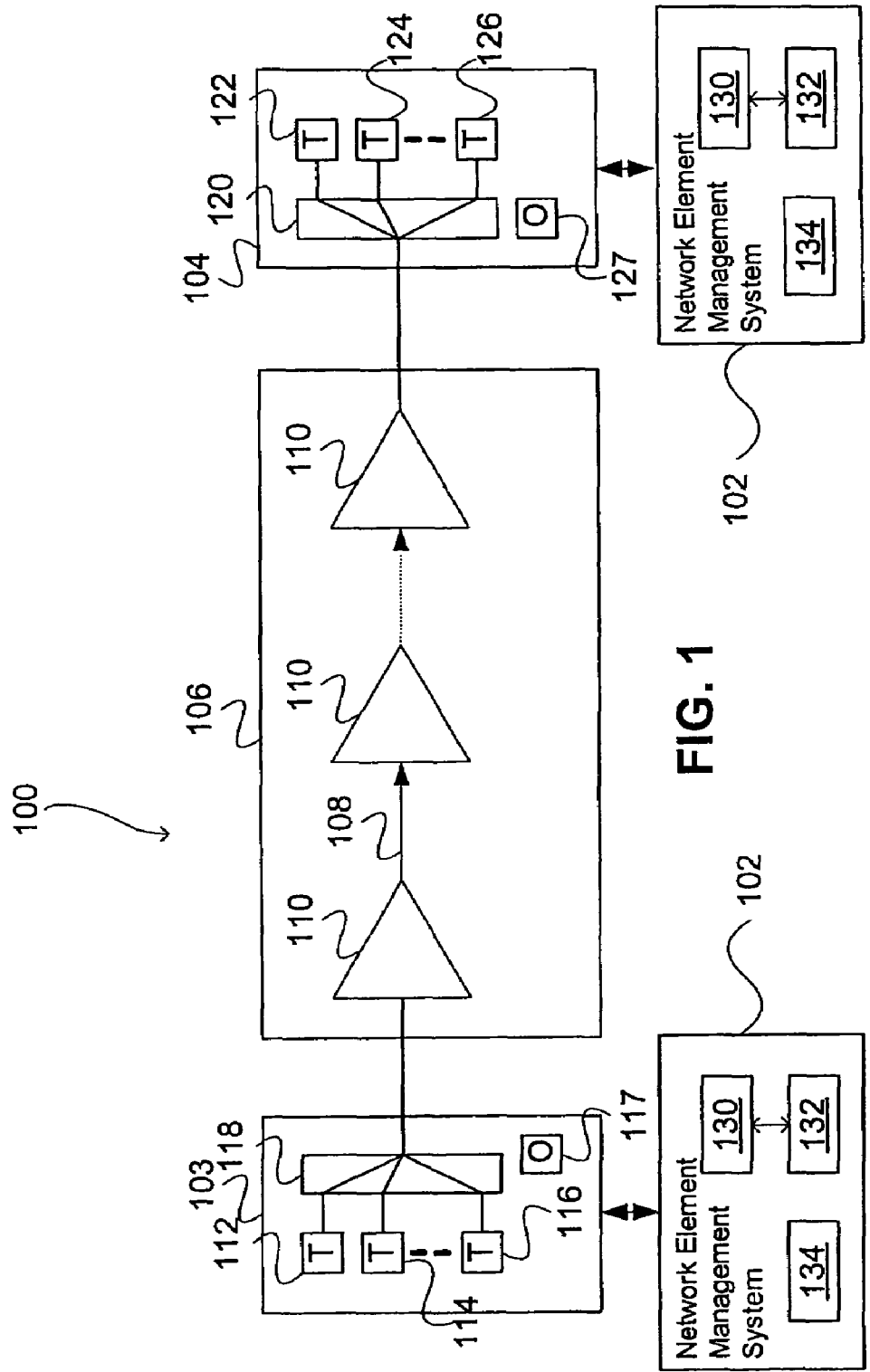
FIG. 1 is a block diagram of an exemplary optical communication system consistent with the present invention.

Turning now to FIG. 1, there is illustrated an exemplary optical communication system 100 consistent with the present invention. Those skilled in the art will recognize that the system 100 has been depicted in a highly simplified form for ease of explanation. It is to be understood that the present invention is not limited to illustrated exemplary embodiments described herein. In fact, the present invention may be incorporated into a wide variety of optical networks, systems and devices without departing from the spirit and scope of the invention.

The optical communication system 100 includes transmitter/receiver terminals 103, 104 connected via an optical information channel 106 supporting bi-directional communication. For clarity, the terminal 103 is generally described and illustrated in FIG. 1 as a transmitting terminal and the terminal 104 is illustrated and generally described as a receiving terminal. Of course, in a bi-directional communication system, both terminals 103, 104 may serve as transmitting and receiving terminals and, as such, each includes both transmitters and receivers and associated multiplexers and de-multiplexers, monitoring equipment, power feed equipment and discrete relay closures used for monitoring and control of other equipment. Change of states of these relay closures (e.g. open/close) generate events with a default state equivalent to the provisioned relay (e.g. normally open or normally closed). Depending on system characteristics and requirements, the optical information channel 106 may include one or more optical fiber paths 108, optical amplifiers 110, regenerators, optical filters, dispersion compensating modules, and other active and passive components. A variety of configurations for each of these elements will be known to those skilled in the art.

The transmitting terminal 103 includes optical transmitters 112, 114 . . . 116 for transmitting optical communication channels at associated wavelengths, e.g., $\lambda_1, \lambda_2 \ldots \lambda_n$. Multiplexer 118 combines these signal into an aggregate signal that is launched into the optical fiber path 108 for transmission to the receiving terminal 104. The transmitting terminal 103 also includes other managed elements 117, such as power feed equipment, monitoring equipment and relay closures.

At the receiving terminal 104, demultiplexer 120 demultiplexes the aggregate signal and routes the channel wavelengths, e.g. $\lambda_1, \lambda_2 \ldots \lambda_n$, to receivers 122, 124, 126, respectively. Similarly, the terminal 104 may also include a multiplexer for combining signals into an aggregate signal that is launched into an optical fiber path for transmission to a demultiplexer in the transmitter/receiver terminal 103. The receiving terminal 104 also includes other managed elements 127, such as power feed equipment, monitoring equipment and relay closures.

A NMS 102 may include a processor 130 and machine-readable media 132 and may be coupled to the network to receive or request information from the network elements and provide management information to a network administrator through a user interface 134. The machine-readable media 132 may store software instructions for execution by the processor to allow active management of the configuration of the network and/or network elements through the user interface 134. The NMS 102 may provide any of a variety of known network element management functions, and may be adapted to suit the particular network it is intended to manage. Those skilled in the art will recognize that there are a variety of configurations for alarm or event reporting by the various network elements. The network elements may report internal alarms corresponding to localized faults, alarms associated with data received or transmitted, e.g. loss of optical signal, high BER, etc., and/or event state changes associated with relay closure state changes.

Figure 2:
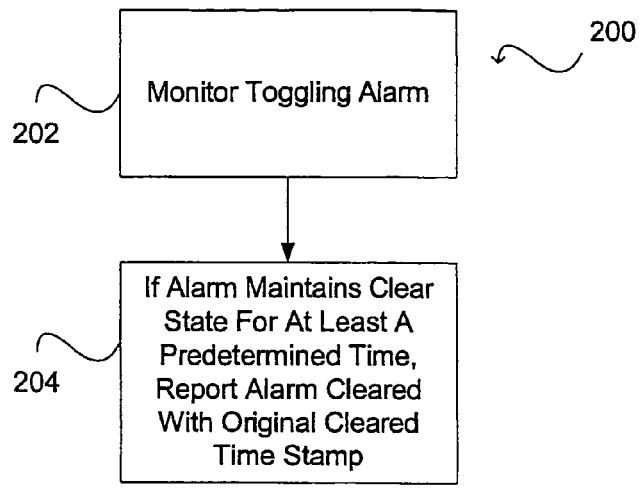
FIG. 2 is a block flow diagram of an exemplary method of managing toggling alarms consistent with the invention.

Advantageously, a NMS 102 consistent with the invention may provide an event hysteresis function consistent with the invention for managing toggling events, e.g. alarms, on the network. FIG. 2 is a block flow diagram of one exemplary embodiment 200 of a method consistent with the invention. The block flow diagrams used herein to describe various embodiments include particular sequences of steps. It can be appreciated, however, that the sequence of steps merely provides an example of how the general functionality described herein can be implemented. Further, each sequence of steps does not have to be executed in the order presented unless otherwise indicated. In the illustrated embodiment, the NMS monitors 202 a toggling alarm reported to the NMS from the network. If the alarm maintains one state for at least a predetermined period of time, the alarm is deemed stable and the stable state is reported 204 by the NMS.

Figure 3:
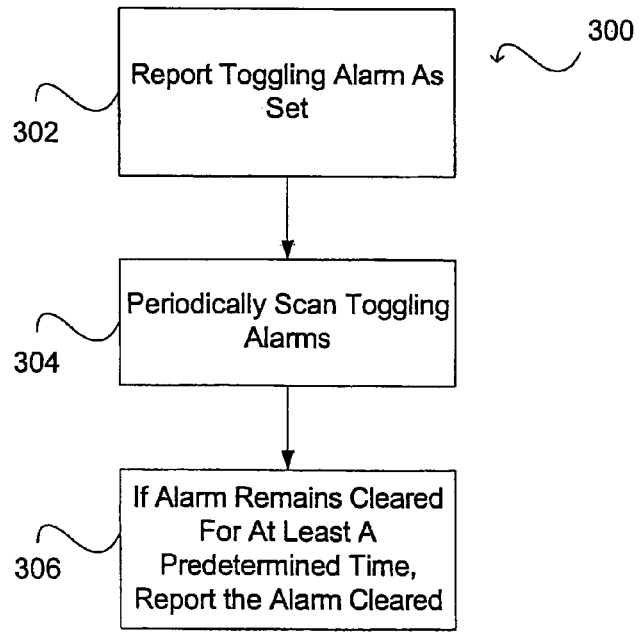
FIG. 3 is a block flow diagram of another exemplary method of managing toggling alarms consistent with the invention.

FIG. 3 is a block flow diagram of another exemplary embodiment 300 of a method consistent with the invention. In the illustrated embodiment, a toggling alarm is reported 302 by the NMS as being set/active. The toggling alarms may be periodically scanned 304 for state changes. If the alarm state changes to cleared and remains cleared for at least a predetermined amount of time, i.e. the alarm stable time, the alarm is deemed stable and is reported 306 as cleared by the NMS. The alarm may be reported as cleared at the time of the last state change, i.e. not at the end of the alarm stable period, to provide accurate information as to when the alarm actually cleared. The number of times that the alarm toggled may also be reported.

Some alarms may be treated differently than others in a system consistent with the invention. It may be desirable to avoid application of a hysteresis feature for some alarms. In the case of FEC threshold-crossing alarm clears, for example, it may be required to report the alarm clears as soon as they are reported from a network element. To facilitate immediate reporting of these alarms, the pre-determined stable time associated with the alarm may be set to zero (0).

Also, it may be desirable to designate a longer or shorter alarm stable time for some alarms compared to others. To accommodate this, default treatment characteristics may be implemented in software for handling each alarm, e.g. on an element-by-element, event-by-event, or alarm-by-alarm basis. The default treatment characteristic for each alarm may be defined in an associated record including an alarm ID, optionally the network element (NE) where the alarm occurred, the alarm stable time for the alarm, and a hysteresis treatment type. A default alarm stable time may be, for example, 10 seconds. The hysteresis types may include; "Normal" for normal hysteresis treatment with the defined alarm stable time; and "Suppress" which may cause the hysteresis function to not report any state changes.

The hysteresis function may be configured for selectively varying the default treatment characteristics for a particular alarm or group of alarms. In one embodiment, the hysteresis settings for a particular alarm or group of alarms may be configurable in a configuration file. For example, the configuration file may facilitate changing the alarm stable time (e.g. between 0 and 60 seconds, where 0 disables hysteresis treatment) or the hysteresis treatment type. The settings for alarms or groups of alarms may be defined in the configuration file based on a network element type or ID. For example, a setting may be configured for particular cable and/or network element. Also, the default alarm stable time may be configured by defining a group including all network elements and setting a new alarm stable time. If no configuration file is found for a particular alarm, the default hysteresis setting may be applied.

Additional configuration settings are possible. For example, the hysteresis functionality may be set in the configuration file to depend on environmental variables. Also, the configuration file may be used to instruct an alarm or group of alarms to be treated in accordance with the configuration file for another alarm or group of alarms. Also, the time period for checking the state of each toggling alarm may be modified, and a default alarm stable time may be set in the configuration file and be modified by other configuration settings.

Figure 4:
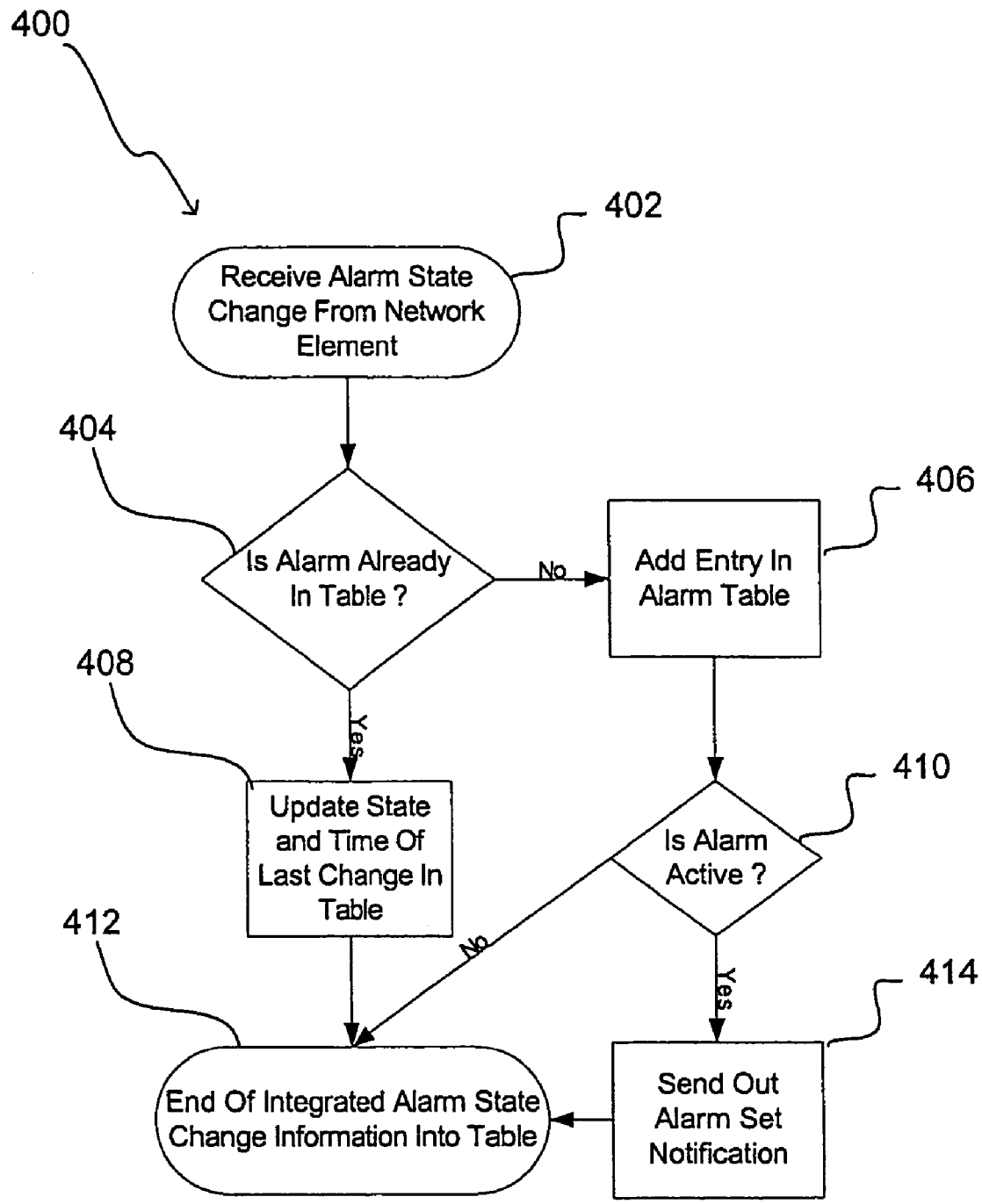
FIG. 4 is a flow chart illustrating one exemplary embodiment for automatically updating a hysteresis table for an alarm consistent with the invention.

To facilitate alarm management, a hysteresis table may be established for listing all un-stable, i.e. toggling, alarms. The table may be updated automatically. FIG. 4 is a flow chart illustrating the flow for one exemplary embodiment 400 of a method of automatically updating a hysteresis table consistent with the invention. As shown, the alarm state may be received 402 from a network element. If the received alarm is already entered in a hysteresis table 404, the illustrated process flow ends 412 with an update of the table to reflect the state and time of the last state change 408. Otherwise, an entry for the alarm may be added 406 to the table. If the alarm is not active 410, the process flow ends 412. If the alarm is active 410, the process flow ends 412 with communication of an alarm set notification 414.

Figure 5:
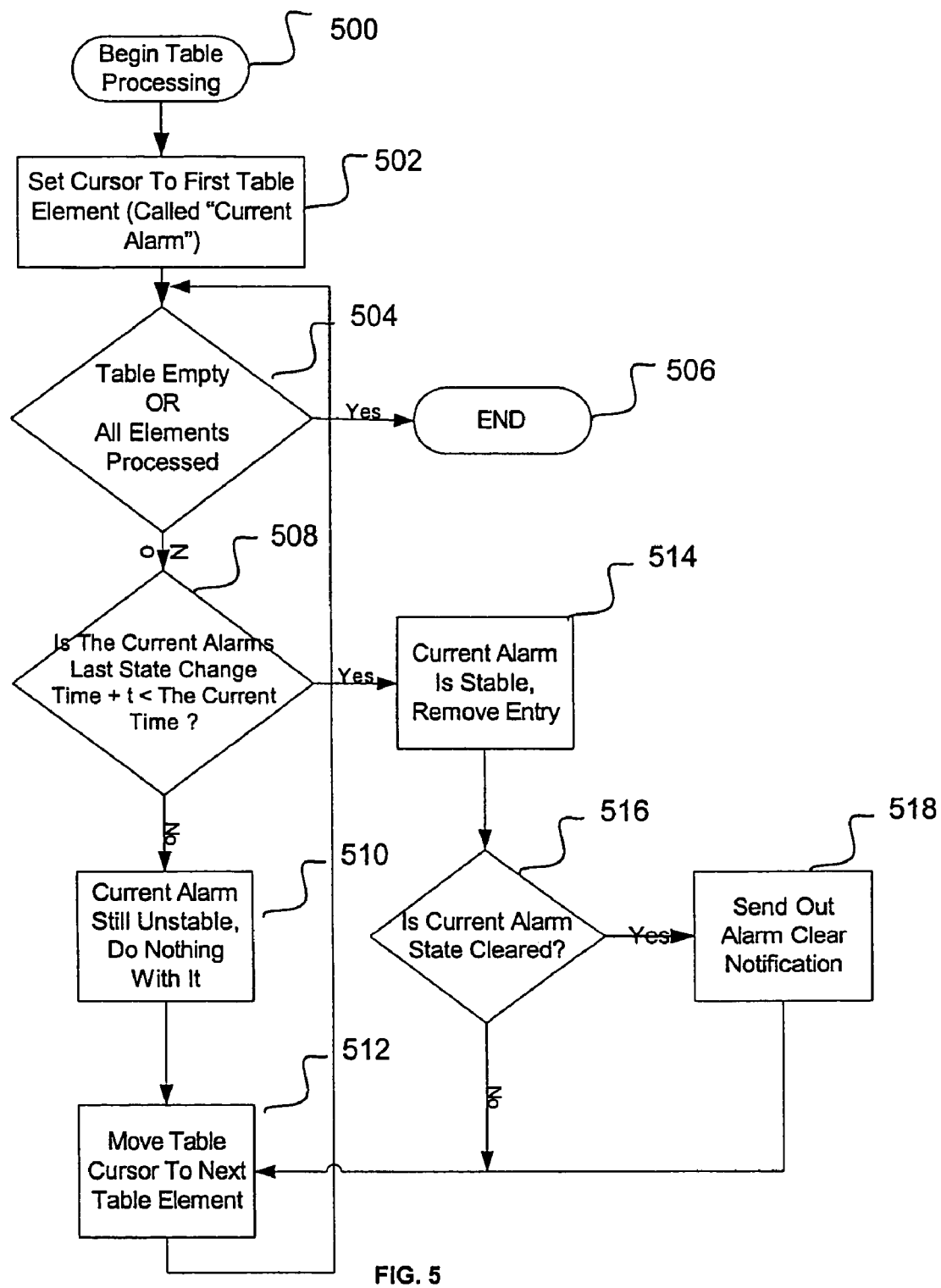
FIG. 5 is a flow chart illustrating one exemplary embodiment for clearing stable alarms consistent with the invention.

Again, in one embodiment, unstable alarms may be reported as set/active. As soon as an unstable alarm maintains a cleared state for a predetermined alarm stable time, it may be removed from the hysteresis table. FIG. 5 is a flow chart illustrating one exemplary embodiment for clearing stable alarms from a hysteresis table consistent with the invention. In the illustrated exemplary embodiment, process flow begins 500 with setting the cursor to the first hysteresis table element 502. If the table is empty or all elements have been processed 504, then the process flow ends 506. Otherwise, if the last state change time plus the alarm stable time, t, associated with the alarm is not less than the current time 508, then the alarm is deemed unstable and the table entry associated with the alarm is left 510 in the table. The table cursor is then moved 512 to the next table element.

If the last state change time plus the alarm stable time, t, associated with the alarm is less than the current time 508, then the alarm is deemed stable and the entry for the alarm is removed 514 from the table. If the alarm state is cleared 516, an alarm clear notification is sent 518. Then the table cursor is moved 512 to the next table element. The process flow moves through each table element to end 506 after the last entry. The process may be repeated periodically to remove stable alarms at a desired frequency.

It will be appreciated that the functionality described for the embodiments of the invention may be implemented using hardware, software, or a combination of hardware and software. If implemented in software, a processor and machine-readable medium are required. The processor can be any type of processor capable of providing the speed and functionality required by the embodiments of the invention. For example, the processor could be a processor from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g. floppy disk and hard drive), optical disk (e.g. CD-ROM), and any other device that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further, although the processor 130 and a single machine readable medium 132 are illustrated as being local to the NMS 102 in FIG. 1, the processor and/or machine-readable medium may be part of a larger distributed system that may contain various combinations of machine-readable storage devices, which are accessible by the processor through various I/O controllers and which are capable of storing a combination of computer program instructions and data.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A method of managing an event toggling between first and second event states in a network management system, said method comprising:

listing said event and a last state change time of said event in a hysteresis table, if said event is not already listed in said hysteresis table;

determining, by a processor, if said event maintains one of said first and second states for a predetermined amount of time, wherein:

if said last state change time of said event plus said predetermined amount of time is not less than current time, then said event is deemed unstable and remains listed in said hysteresis table; and if said last state change time plus said predetermined amount of time is less than the current time, then said event is deemed stable and is removed from said hysteresis table; and reporting said event as having one of said first and second states only after said one of said first and second states is maintained for said predetermined amount of time, wherein said reporting said event as having said one of said first and second states comprises reporting said event as achieving said one of said first and second states at said last state change time of said event.

2. A method according to claim 1, wherein said event is an alarm.

3. A method according to claim 2, wherein said first state is an alarm set state, and said second state is an alarm clear state.

4. A method according to claim 1, said method further comprising reporting a number of times said event toggled between said first and second states.

5. A method according to claim 1, said method further comprising reporting said event as being in a toggling condition.

6. A method according to claim 1, said method further comprising reporting said event as not being in a toggling condition.

7. A method according to claim 1, further comprising sending a set notification prior to said reporting, and said reporting consists of sending a clear notification.

8. A method according to claim 1, wherein said hysteresis table includes a plurality of events and corresponding last state change times, and said determining is repeated periodically to remove stable events from said hysteresis table.

9. A method of managing an event toggling between first and second event states in a network management system, said method comprising:
  listing said event and a last state change time of said event in a hysteresis table, if said event is not already listed in said hysteresis table;
  reporting said event as having said first state;
  monitoring, by a processor, said event to determine if said event maintains said second state for a predetermined amount of time, wherein:
    if said last state change time of said event plus said predetermined amount of time is not less than current time, then said event is deemed unstable and remains listed in said hysteresis table; and
    if said last state change time plus said predetermined amount of time is less than the current time, then said event is deemed stable and is removed from said hysteresis table; and
  reporting said event as having said second state only after said second state is maintained for said predetermined amount of time, wherein said reporting said event as having said second state comprises reporting said event has achieving said second state at said last state change time of said event.

10. A method according to claim 9, wherein said event is an alarm.

11. A method according to claim 10, wherein said first state is an alarm set state, and said second state is an alarm clear state.

12. A method according to claim 9, said method further comprising reporting said number of times said event toggled between said first and second states.

13. A method according to claim 9, said method further comprising reporting said event as being in a toggling condition.

14. A method according to claim 9, said method further comprising reporting said event as not being in a toggling condition.

15. A method according to claim 9, further comprising sending a set notification prior to said reporting, and said reporting consists of sending a clear notification.

16. A method according to claim 9, wherein said hysteresis table includes a plurality of events and corresponding last state change times, and said determining is repeated periodically to remove stable events from said hysteresis table.

17. A machine-readable medium whose contents cause a network management system to perform a method of managing an event toggling between first and second event states, said method comprising:
  listing said event and a last state change time of said event in a hysteresis table, if said event is not already listed in said hysteresis table;
  determining if said event maintains one of said first and second states for a predetermined amount of time, wherein:
    if said last state change time of said event plus said predetermined amount of time is not less than current time, then said event is deemed unstable and remains listed in said hysteresis table; and
    if said last state change time plus said predetermined amount of time is less than the current time, then said event is deemed stable and is removed from said hysteresis table; and
  reporting said event as having one of said first and second states only after said one of said first and second states is maintained for said predetermined amount of time, wherein said reporting said event as having said one of said first and second states comprises reporting said event as achieving said one of said first and second states at said last state change time of said event.

18. The machine readable medium of claim 17, wherein said event is an alarm.

19. The machine readable medium of claim 18, wherein said first state is an alarm set state, and said second state is an alarm clear state.

20. The machine readable medium of claim 17, said method further comprising reporting a number of times said event toggles between said first and second states.

21. The machine readable medium of claim 17, said method further comprising reporting said event as being in a toggling condition.

22. The machine readable medium of claim 17, said method further comprising reporting said event as not being in a toggling condition.

23. The machine readable medium of claim 17, further comprising sending a set notification prior to said reporting, and said reporting consists of sending a clear notification.

24. The machine readable medium of claim 17, wherein said hysteresis table includes a plurality of events and corresponding last state change times, and said determining is repeated periodically to remove stable events from said hysteresis table.

25. A network management system comprising:
  a machine-readable medium whose contents cause said system to perform a method of managing an event toggling between first and second event states, the method comprising:
    listing said event and a last state change time of said event in a hysteresis table, if said event is not already listed in said hysteresis table;
    determining if said event maintains one of said first and second states for a predetermined amount of time, wherein:
      if said last state change time of said event plus said predetermined amount of time is not less than current time, then said event is deemed unstable and remains listed in said hysteresis table; and
      if said last state change time plus said predetermined amount of time is less than the current time, then said event is deemed stable and is removed from said hysteresis table; and reporting said event as having one of said first and second states only after said one of said first and second states is maintained for said predetermined amount of time, wherein said reporting said event as having said one of said first and second states comprises reporting said event as achieving said one of said first and second states at said last state change time of said event.

26. The system of claim 25, wherein said event is an alarm.

27. The system of claim 26, wherein said first state is an alarm set state, and said second state is an alarm clear state.

28. The system of claim 25, said method further comprising reporting said number of times said event toggled between said first and second states.

29. The system of claim 25, said method further comprising reporting said event as being in a toggling condition.

30. The system of claim 25, said method further comprising reporting said event as not being in a toggling condition.

31. The system of claim 25, further comprising sending a set notification prior to said reporting, and said reporting consists of sending a clear notification.

32. The system of claim 25, wherein said hysteresis table includes a plurality of events and corresponding last state change times, and said determining is repeated periodically to remove stable events from said hysteresis table.

33. An optical communication system comprising:
  at least one transmitter for transmitting an optical signal to a receiver through an optical information channel, at least one of said transmitter, said receiver and said optical information channel comprising at least one apparatus for reporting an event; and
  a network management system coupled to the optical communication system for receiving said report of said event, said network management system comprising a machine-readable medium whose contents cause said network management system to perform a method of managing an event toggling between first and second event states, the method comprising:
    listing said event and a last state change time of said event in a hysteresis table, if said event is not already listed in said hysteresis table;
    determining if said event maintains one of a first and a second state for a predetermined amount of time, wherein:
      if said last state change time of said event plus said predetermined amount of time is not less than current time, then said event is deemed unstable and remains listed in said hysteresis table; and
      if said last state change time plus said predetermined amount of time is less than the current time, then said event is deemed stable and is removed from said hysteresis table; and
    reporting said event as having one of said first and second states only after said one of said first and second states is maintained for said predetermined amount of time, wherein said reporting said event as having said one of said first and second states comprises reporting said event as achieving said one of said first and second states at said last state change time of said event.

34. The system of claim 33, wherein said event is an alarm.

35. The system of claim 34, wherein said first state is an alarm set state, and said second state is an alarm clear state.

36. The system of claim 33, said method further comprising reporting a number of times said event toggled between said first and second states.

37. The system of claim 33, said method further comprising reporting said event as being in a toggling condition.

38. The system of claim 33, said method further comprising reporting said event as not being in a toggling condition.

39. The system of claim 33, further comprising sending a set notification prior to said reporting, and said reporting consists of sending a clear notification.

40. The system of claim 33, wherein said hysteresis table includes a plurality of events and corresponding last state change times, and said determining is repeated periodically to remove stable events from said hysteresis table.

* * * * *